(12) United States Patent
Da-Silva et al.

(10) Patent No.: US 7,536,854 B2
(45) Date of Patent: May 26, 2009

(54) METHOD FOR REGENERATING A MOTOR VEHICLE PARTICLE FILTER AND SYSTEM FOR CONTROLLING REGENERATION OF SUCH A FILTER

(75) Inventors: Manuel Da-Silva, La Ferte Alais (FR); Marc Guyon, La Norville (FR); Erwan Radenac, Palaiseau (FR)

(73) Assignee: Renault S.A.S, Boulogne Billancourt (FR)

( * ) Notice: Subject to any disclaimer, the term of this patent is extended or adjusted under 35 U.S.C. 154(b) by 438 days.

(21) Appl. No.: 10/517,312

(22) PCT Filed: Jun. 17, 2003

(86) PCT No.: PCT/FR03/01826

§ 371 (c)(1),
(2), (4) Date: Aug. 10, 2005

(87) PCT Pub. No.: WO03/106823

PCT Pub. Date: Dec. 24, 2003

(65) Prior Publication Data

US 2006/0086095 A1    Apr. 27, 2006

(30) Foreign Application Priority Data

Jun. 18, 2002    (FR) .................... 02 07494

(51) Int. Cl.
*F01N 3/00*    (2006.01)
(52) U.S. Cl. .............. 60/295; 60/274; 60/286; 60/297; 60/311
(58) Field of Classification Search ............ 60/274, 60/286, 295, 297, 311
See application file for complete search history.

(56) References Cited

U.S. PATENT DOCUMENTS

| | | | | |
|---|---|---|---|---|
| 5,319,930 A | * | 6/1994 | Shinzawa et al. | 60/286 |
| 5,941,066 A | * | 8/1999 | Araki et al. | 60/280 |
| 6,438,948 B2 | * | 8/2002 | Ono et al. | 60/311 |
| 6,644,022 B2 | * | 11/2003 | Hirota et al. | 60/297 |
| 6,786,041 B2 | * | 9/2004 | Itoh et al. | 60/274 |
| 6,820,418 B2 | * | 11/2004 | Nakatani et al. | 60/297 |
| 6,928,809 B2 | * | 8/2005 | Inoue et al. | 60/297 |
| 2006/0086095 A1 | | 4/2006 | Da-Silva et al. | |

FOREIGN PATENT DOCUMENTS

| | | |
|---|---|---|
| FR | 2 799 504 | 4/2001 |
| FR | 2 814 498 | 3/2002 |
| JP | 2001-280118 | 10/2001 |
| JP | 2001-317330 | 11/2001 |
| WO | 01 48358 | 7/2001 |

OTHER PUBLICATIONS

U.S. Appl. No. 11/993,134, filed Dec. 19, 2007, Radenac et al.

* cited by examiner

*Primary Examiner*—Binh Q. Tran
(74) *Attorney, Agent, or Firm*—Oblon, Spivak, McClelland, Maier & Neustadt, P.C.

(57) ABSTRACT

A method for regenerating a motor vehicle particle filter that uses a mechanism for regenerating the filter when a load value exceeds a predetermined threshold. Further, a parameter representing operating conditions of the regenerating mechanism is calculated, and the operating conditions of the regenerating mechanism are controlled on the basis of the parameter.

11 Claims, 1 Drawing Sheet

Figure 1:
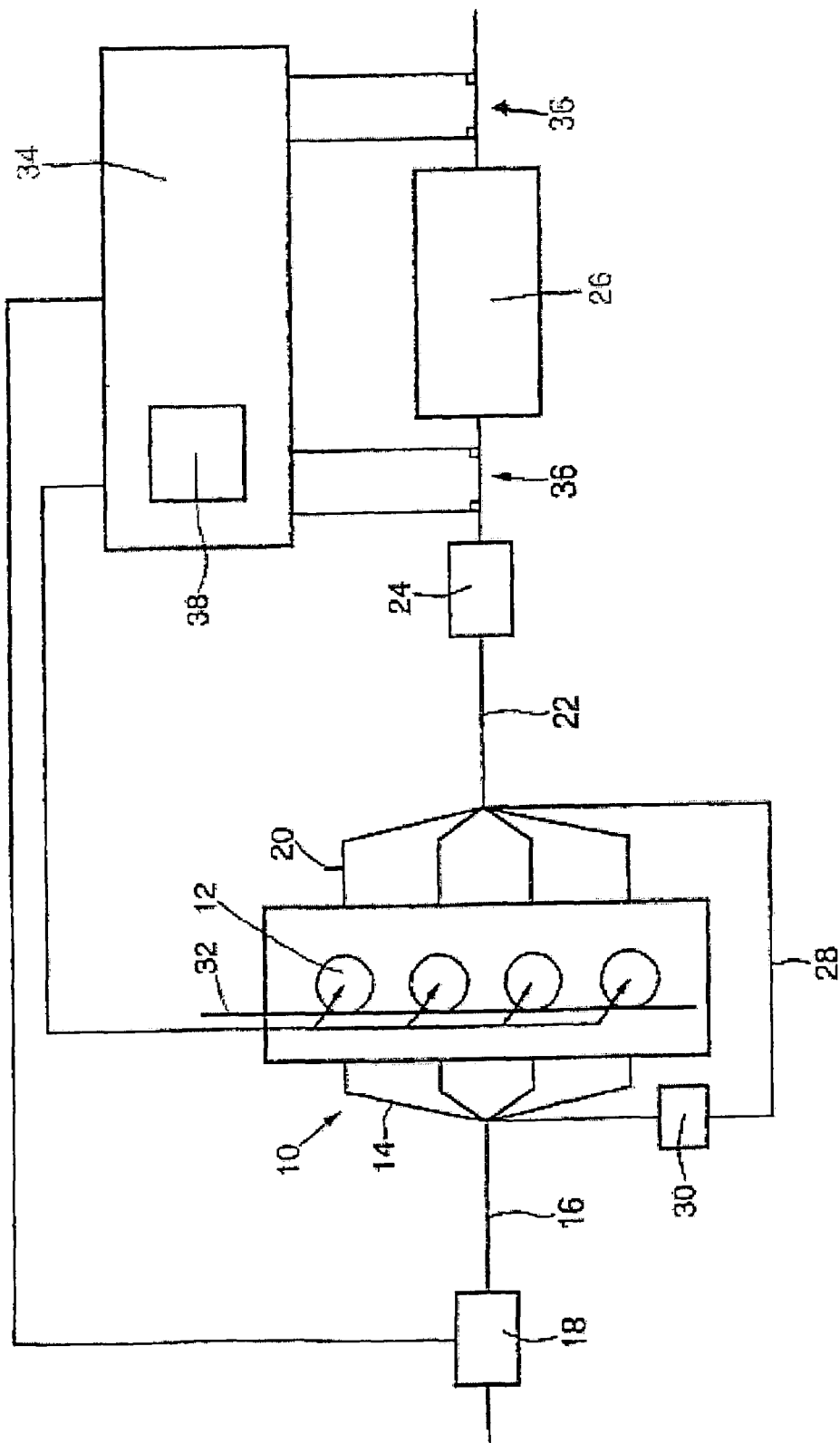

METHOD FOR REGENERATING A MOTOR VEHICLE PARTICLE FILTER AND SYSTEM FOR CONTROLLING REGENERATION OF SUCH A FILTER

BACKGROUND OF THE INVENTION

1. Field of the Invention

This invention concerns a method of regenerating a motor vehicle particle filter as well as a system for controlling the regeneration of such a filter.

2. Discussion of Background

The heterogeneity of combustion processes in engines and, in particular, in diesel engines has the effect of generating carbon particles, which cannot be efficiently burned off in the engine. That is manifested by the appearance, at the outlet of the exhaust line, of the black smoke characteristic of diesel engines. This phenomenon occurs, in particular, on starting phases and on marked accelerations.

The presence of a particle filter in the exhaust line of the engine makes it possible to reduce considerably the quantity of particles, dust and other soot emitted in the atmosphere and to satisfy antipollution standards.

Controlled regenerating devices make it possible to burn off periodically the particles trapped in the filter and to avoid clogging of the latter.

This is accomplished by raising the temperature in the particle filter to a temperature of around 550 to 600° C., from which temperature the carbon particles retained in the filter spontaneously ignite.

The combustion of those particles produces a release of energy, depending on the operating conditions of the engine. That energy can be evacuated by the flow of exhaust gases coming from the engine, transmitted to the soot bed from which the filter is loaded or transmitted to the different elements comprising the particle filter or, in general, the pollution control system.

Thus, depending on the running conditions of the vehicle, it can happen that the energy released by combustion of the carbon particles might no longer be evacuated. This situation is expressed by a considerable increase in the speed of the chemical reactions generated and a runaway of the latter. That type of process can therefore give rise to a deterioration of the particle filtration system.

Devices for diagnosis of the state of operation of the filtration system generally trigger regeneration when the quantity of soot stored in the particle filter is such that regeneration can be carried out under fully controllable conditions.

Nevertheless, it is possible that under very specific running conditions, in an urban environment, for example, the conditions required for the initiation of regeneration might not be attained. The start of regeneration under those conditions can have harmful consequences on the filtering system.

SUMMARY OF THE INVENTION

The object of the invention is also to provide a method of regeneration of a particle filter making it possible to determine the consequences of a regeneration on the filtration system, depending on the running conditions of the vehicle.

Thus, the invention proposes a method of regeneration of a motor vehicle particle filter, according to which means of regeneration of the filter are used as soon as the load value of the filter exceeds a predetermined threshold.

According to a general characteristic of that method, a calculation is made of a parameter representing the operating conditions of the means of regeneration, and operation of the means of regeneration is controlled in accordance with the value of said parameter.

According to another characteristic of that method of regeneration, the said parameter is calculated continuously while the vehicle is running.

The calculation of said parameter is, for example, made during use of the means of regeneration.

According to another characteristic of the method of the invention, the parameter representing operating conditions of the means of regeneration consists of the ratio between the flow of exhaust gases emanating from the engine of the vehicle and the mass of soot burned in the course of use of the means of regeneration over a predetermined period of time.

For example, that parameter representing operating conditions of the means of regeneration consists of the ratio between the instantaneous flow of exhaust gases and the rate of combustion of the soot.

According to one embodiment, operation of the means of regeneration is controlled by a comparison between the value of said parameter and at least one threshold value stored in memory.

According to another embodiment, the flow of exhaust gases is extracted from a map stored in memory in a central computer managing operation of the engine of the vehicle.

The mass of soot burned is, for example, extracted from a map stored in the memory in the central computer. It can also be determined from the mass of soot previously burned and the rate of regeneration of the filter.

According to an advantageous embodiment, the rate of regeneration of the filter is extracted from a map stored in memory in a central computer managing operation of the engine of the vehicle, depending on the internal temperature of the particle filter.

Finally, the internal temperature $Tf\alpha p$ of the particle filter is, for example, calculated from the equation:

$$Tf\alpha p = \alpha Te + (1-\alpha) \times Ts$$

in which

Te designates the inlet temperature of the particle filter;

Ts designates the outlet temperature of the particle filter; and $\alpha$ designates a coefficient worked out as a function of the difference between the inlet temperature Te and the outlet temperature Ts, based on a mapped function in the central computer.

According to the invention, a system of control of the regeneration of a motor vehicle particle filter is also proposed, comprising means of control of the load level of the particle filter, in order to produce the use of means of regeneration.

According to one aspect of that system, the latter further contains means for calculation of a parameter representing operating conditions of the means of regeneration in order to control operation of the means of regeneration as a function of the value of said parameter.

Other objects, characteristics and advantages of the invention will be apparent on reading the following description, given solely by way of nonlimitative example and made with reference to the attached drawing that schematically illustrates the structure of an internal combustion engine equipped with a particle filter using the method of the invention.

FIG. 1 discloses the preferred embodiment of the present invention and shows a diesel engine supercharged by a turbocompressor.

DESCRIPTION OF THE PREFERRED EMBODIMENT

In the example represented, the engine 10 contains four cylinders 12, arranged in a line. It is supplied with fresh air through an intake distributor 14, which in turn is supplied by a feed pipe 16 provided with an air filter (not represented) and equipped with a flow meter 18.

Furthermore, the engine 10 is equipped with an exhaust manifold 20, connecting with an exhaust line 22 provided with a particle filtration system, consisting essentially of a catalytic oxidation chamber 24 and a particle filter 26.

A circuit recirculating the exhaust gases 28, which is provided with a recirculation valve 30, recovers a portion of the exhaust gases emanating from combustion and reinjects them into the intake distributor 14.

The engine 10 is supplied with fuel through a feed circuit 32. For example, that feed circuit is a common ramp high-pressure circuit.

Finally, a duly programmed computer, designated by the general numerical reference 34, manages operation of the engine 10, notably the quantity of fuel injected or moment of ignition of the engine, so as to deliver the torque required by the driver.

In particular, the computer 34 receives test signals from sensors, such as 36, equipping the exhaust line upstream and downstream from the particle filter 26, coming from the flow meter 18 equipping the intake pipe 16, and employs the value of other operating variables of the engine, such as the working conditions of the engine, the ambient air temperature, the operating fluid temperature, etc., as is well known to the expert.

It incorporates all of the hardware and software means for controlling the different operating parameters of the engine, such as fuel injection, stroke of intake and exhaust valves, quantity of gases recirculated, etc., from a map 38 stored in memory in the computer 34.

In particular, it monitors the load value of the particle filter, and when that level exceeds a predetermined threshold value, it uses the means of regeneration of the filter 26. Those means of regeneration consist of standard means, well known to the expert. They will therefore not be described in detail below.

It will be noted, however, that those means consist essentially of means making it possible to create a particular gaseous environment in the particle filter, which is heated to a temperature of approximately 550 to 600° C., in order to produce an energy necessary for spontaneous ignition of the carbon particles contained in the filter 26.

As far as determining the load level of the filter is concerned, this can be done by different means, such as measuring the pressure difference prevailing upstream and downstream from the particle filter.

Furthermore, in order to prevent regeneration from being carried out under conditions such as to risk impairing the elements forming part of the gaseous effluent treatment system, the computer 34 calculates, during running of the vehicle and, in particular, in the course of regeneration, a parameter representing the operating conditions of the means of regeneration, and controls those means of regeneration, according to the value of the parameter thus calculated, so as to prevent regeneration from taking place in situations such that the energy released by combustion of the soot might no longer be evacuated, which would be manifested by a runaway of the chemical reactions used.

That control parameter consists, for example, of the ratio between the flow of exhaust gases and the mass of soot burned. That ratio is periodically calculated, in the course of regeneration of the filter, for a period of time that can range from one second to a duration corresponding to the regeneration phase.

As can be surmised, in the case where that period is around one second, this ratio actually corresponds to the ratio between the instantaneous flow of exhaust gases and the rate of combustion of the soot.

The computer 34 then calculates the difference between the ratio thus calculated and reference values d1ref and d2ref, implanted in memory, and obtained by prior learning.

Thus, if the parameter calculated is less than the first threshold value d1ref, it is considered that regeneration of the filter will unfold normally. The energy generated by the chemical reactions used is totally evacuated by the flow of exhaust gases. On the other hand, if the parameter ranges between d1ref and d2ref, a risk of runaway regeneration exists.

The driving conditions and, therefore, the promptings of the driver then affect the occurrence of such a runaway. Under those conditions, a potential risk exists of damage to the particle filter. The computer 34 then brings about execution of a procedure of control of the means of regeneration of the filter, so as to limit or reduce the rate of regeneration and even possibly stop it.

Finally, if the parameter calculated is greater than the threshold value d2ref, it is considered that runaway regeneration has taken place and that the filter has been damaged. The difference between the parameter and that threshold value d2ref then makes it possible to give an indication of the degree of damage. The driver of the vehicle is then informed of that situation and is asked to go to a garage for inspection and maintenance.

As far as the procedure of calculation of the parameter controlling operation of the means of regeneration of the filter is concerned, the flow of gas is a value which is extracted from the map 38, as a function of the operating parameters of the engine. The mass of soot burned can also be extracted from the map 38. As a variant, it can be calculated from the mass of soot previously burned, that is, on the previous period of calculation, and from the rate of regeneration of the filter.

In other words, the mass of soot $M(i+1)$ at instant $i+1$ is determined from the equation:

$$M(i+1)=M(i)-V(i), \text{ in which:}$$

$M(i)$ designates the mass of soot at instant $i$, and $V(i)$ designates the rate of regeneration at instant $i$.

The rate of regeneration $V(i)$ is also extracted from the map 38, as a function of the internal temperature of the particle filter 26, based on the following equation:

$$Tfap = \alpha Te + (1-\alpha) \times Ts$$

in which

Te designates the inlet temperature of the particle filter;

Ts designates the outlet temperature of the particle filter; and $\alpha$ designates a coefficient worked out as a function of the difference between the inlet temperature Te and the outlet temperature Ts, based on a mapped function in the central computer.

In other words, to calculate the mass of soot burned, the computer 34 calculates the internal temperature of the particle filter from the equation previously described and extracts from the map 38 a corresponding rate of regeneration, then calculates the mass of soot burned from that rate of regeneration.

As can be surmised, the invention just described makes it possible, in the course of regeneration, to have an indication of the risks associated with the conditions of regeneration and to adjust operation of the means of regeneration accordingly, so as to avoid any deterioration of the particle filter.

The invention claimed is:

1. A method of regeneration of a motor vehicle particle filter, in which a device configured for regeneration of the filter is used as soon as a load value of the filter exceeds a predetermined threshold, comprising:
   calculating a parameter representing operating conditions of the device configured for regeneration; and
   controlling operation of the device configured for regeneration in accordance with a value of the parameter wherein the parameter representing the operating conditions of the device configured for regeneration includes a ratio of a flow of exhaust gases emanating from an engine of the vehicle and a measurement of a mass of soot burned during use of the device for regeneration over a predetermined period of time,
   wherein said mass of soot is determined from the equation:
   $M(i+1)=M(i)-V(i)$, in which:
   M(i) designates the mass of soot at instant i, and
   V(i) designates the rate of regeneration at instant i.

2. A method of regeneration according to claim 1, which comprises calculating the parameter continuously while the vehicle is running.

3. A method of regeneration according to claim 1, which comprises calculating the parameter during use of the device configured for regeneration.

4. A method of regeneration according to claim 1, wherein the parameter representing the operating conditions of the device configured for regeneration includes a ratio between instantaneous flow of exhaust gases and a rate of combustion of soot.

5. A method of regeneration according to claim 1, which comprises controlling operation of the device configured for regeneration by a comparison between the value of the parameter and at least one threshold value stored in memory.

6. A method of regeneration according to claim 1, which comprises extracting the flow of exhaust gases from a map stored in a memory in a central computer managing operation of the engine of the vehicle.

7. A method of regeneration according to claim 6, which comprises extracting the mass of soot burned from the map stored in the memory in the central computer.

8. A method of regeneration according to claim 1, which comprises determining the mass of soot burned from the mass of soot previously burned and a rate of regeneration of the filter.

9. A method of regeneration according to claim 8, which comprises extracting the rate of regeneration of the filter from a map stored in a memory in a central computer managing operation of the engine of the vehicle, depending on an internal temperature of the particle filter.

10. A method of regeneration according to claim 9, wherein the internal temperature $Tf\alpha p$ of the particle filter is calculated from equation:

$Tf\alpha p = \alpha Te + (1-\alpha) \times Ts$, in which
Te designates inlet temperature of the particle filter;
Ts designates outlet temperature of the particle filter; and
$\alpha$ designates a coefficient worked out as a function of the difference between the inlet temperature Te and the outlet temperature Ts, based on a mapped function in the central computer.

11. A system of control of regeneration of a motor vehicle particle filter, comprising:
   a device configured for controlling a load level of the particle filter, and for regeneration of the filter;
   a device configured for calculation of a parameter representing operating conditions of the device configured for regeneration so as to control operation of the device configured for regeneration as a function of a value of the parameter wherein the parameter representing operating conditions of the device for regeneration comprises a ratio of a flow of exhaust gases emanating from an engine of the vehicle and a measurement of a mass of soot burned during use of the device configured for regeneration over a predetermined period of time,
   wherein said mass of soot is determined from the equation:
   $M(i+1)=M(i)-V(i)$, in which:
   M(i) designates the mass of soot at instant i, and
   V(i) designates the rate of regeneration at instant i.

* * * * *